(12) United States Patent
Oshima

(10) Patent No.: US 11,506,301 B2
(45) Date of Patent: Nov. 22, 2022

(54) FLOW RATE ADJUSTING VALVE

(71) Applicant: SMC CORPORATION, Tokyo (JP)

(72) Inventor: Yuta Oshima, Moriya (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 17/452,088

(22) Filed: Oct. 25, 2021

(65) Prior Publication Data
US 2022/0154840 A1    May 19, 2022

(30) Foreign Application Priority Data

Nov. 16, 2020  (JP) .............................. JP2020-189945

(51) Int. Cl.
*F16K 31/05*    (2006.01)
*F16K 1/36*     (2006.01)
*F16K 35/02*    (2006.01)

(52) U.S. Cl.
CPC .............. *F16K 31/05* (2013.01); *F16K 1/36* (2013.01)

(58) Field of Classification Search
CPC .......... F16K 31/05; F16K 35/027; F16K 1/38; F16K 1/50
USPC .................................................... 251/129.03
See application file for complete search history.

(56) References Cited

U.S. PATENT DOCUMENTS

| | | | | |
|---|---|---|---|---|
| 2,327,980 A * | 8/1943 | Bryant | ................... | F16D 21/02 74/625 |
| 3,309,942 A * | 3/1967 | Caldwell | ................. | F16H 37/00 74/625 |
| 4,092,877 A * | 6/1978 | Ledeen | ................... | F16K 31/05 74/625 |
| 4,493,336 A * | 1/1985 | Renfro | ...................... | F16K 1/02 251/363 |
| 4,647,007 A * | 3/1987 | Bajka | ...................... | F16K 31/05 251/129.03 |
| 4,759,386 A * | 7/1988 | Grouw, III | .......... | F16K 37/0041 137/554 |
| 5,547,164 A * | 8/1996 | Ratnik | ...................... | E03B 9/02 251/129.11 |
| 2003/0030337 A1* | 2/2003 | Aoki | ...................... | F16K 31/05 310/68 R |

(Continued)

FOREIGN PATENT DOCUMENTS

| | | | | |
|---|---|---|---|---|
| CN | 108561605 A | * | 9/2018 | ............ F16K 31/02 |
| CN | 109630738 A | * | 4/2019 | ............ F16K 31/05 |
| EP | 2 484 948 A1 | | 8/2012 | |

(Continued)

OTHER PUBLICATIONS

Extended European Search Report dated Apr. 28, 2022 in European Patent Application No. 21207072.6, 8 pages.

*Primary Examiner* — Marina A Tietjen
(74) *Attorney, Agent, or Firm* — Oblon, McClelland, Maier & Neustadt, L.L.P.

(57) ABSTRACT

A flow rate adjusting valve, in which a needle valve is arranged so as to face a fluid passage of a main body, is equipped with a handle configured to enable a rotational operation to be performed manually, an electric motor configured to be operated remotely, and a motive power transmission mechanism that selectively switches between a rotational operating force of the handle and a driving force of the electric motor, and to transmit the force to the needle valve. The switching is performed by causing the handle to be moved in a direction of an axis of rotation.

8 Claims, 6 Drawing Sheets

(56) References Cited

U.S. PATENT DOCUMENTS

2012/0199767 A1* 8/2012 Mori .................. H02P 29/0016
324/207.25

FOREIGN PATENT DOCUMENTS

| JP | 58121383 A | * | 7/1983 | |
|---|---|---|---|---|
| JP | 5061258 B2 | | 10/2012 | |
| RU | 2406905 C2 | * | 12/2010 | ........... F16K 31/041 |
| WO | WO-8805567 A | * | 7/1988 | ............. F16K 31/05 |
| WO | WO-2007017831 A1 | * | 2/2007 | ........... F16K 31/041 |

* cited by examiner

FLOW RATE ADJUSTING VALVE

CROSS-REFERENCE TO RELATED APPLICATION

This application is based upon and claims the benefit of priority from Japanese Patent Application No. 2020-189945 filed on Nov. 16, 2020, the contents of which are incorporated herein by reference.

BACKGROUND OF THE INVENTION

Field of the Invention

The present invention relates to a flow rate adjusting valve that adjusts a flow rate in a fluid passage.

Description of the Related Art

Conventionally, as a means for adjusting the speed of a fluid pressure cylinder, a flow rate adjusting valve (speed controller) that is capable of adjusting a flow path area by a manual operation has been known. The flow rate adjusting valve is disposed, for example, in a flow path connecting a fluid pressure cylinder and a fluid supply source, or in a flow path connecting the fluid pressure cylinder and a discharge port.

Further, as shown in JP 5061258 B2, an electric needle valve is also known in which a valve opening degree is adjusted by an electric motor, so as to enable the flow rate of a fluid supplied to an actuator to be remotely controlled.

SUMMARY OF THE INVENTION

Even in the case of such a flow rate adjusting valve in which the valve opening degree is adjusted by driving an electric motor by remote control, when the equipment is started up, it is necessary to manually adjust the degree of the valve opening, and to confirm operation of the equipment or the like. In general, an assembly process of the production equipment is carried out by a procedure of assembling a machine body, providing pneumatic piping and electrical wiring, and downloading a program to a PLC or the like. Remote control signals can be transmitted to the electric motor only after downloading of the program has been completed. Confirmation of operations while the equipment is being driven must be carried out at an earlier stage, and at that time, such a confirmation must be performed manually.

Further, in the case of remote control via a PLC, a system operator or a software engineer is generally required. There are also cases in which a person performing maintenance of the equipment does not possess the necessary capability to operate the equipment remotely. If the degree of opening of the flow rate adjusting valve cannot be adjusted manually, cooperation of a system operator or a software engineer must be sought, which is troublesome and time consuming.

Of course, it is possible to provide a manual operating unit for the flow rate adjusting valve that drives the electric motor to adjust the valve opening degree. However, in the case of using a small-scale electric motor equipped with a speed reducing gear having a large speed reducing ratio, in a state in which the operating unit is connected to the electric motor on a driven side of the speed reducing gear, a situation occurs in which manual operation thereof is difficult.

As described above, there is a demand for a flow rate adjusting valve in which a valve opening degree is capable of being adjusted both manually and by an electric motor. However, practical implementations thereof have not yet been adequately developed. The present invention has the object of solving the aforementioned problem.

A flow rate adjusting valve according to the present invention is one in which a needle valve is arranged so as to face a fluid passage of a main body, the flow rate adjusting valve including a handle configured to enable a rotational operation to be performed manually, an electric motor configured to be operated remotely, and a motive power transmission mechanism configured to selectively switch between a rotational operating force of the handle and a driving force of the electric motor, and to transmit the force to the needle valve, wherein the switching is performed by causing the handle to be moved in a direction of an axis of rotation.

According to the above-described flow rate adjusting valve, regardless of the specifications of the electric motor, manual operation of the handle can be easily realized. Further, since the rotational operating force of the handle and the driving force of the electric motor can be selectively switched by way of a push-pull operation of causing the handle to be moved in the direction of the axis of rotation, ease of operation is satisfactory. Furthermore, since the handle is not rotated together therewith by the electric motor, the safety of on-site workers is assured.

The flow rate adjusting valve according to the present invention is also equipped with a motive power transmission mechanism that selectively switches between the rotational operating force of the handle and the driving force of the electric motor, and transmits the selected force to the needle valve. Therefore, regardless of the specifications of the electric motor, manual operation of the handle can be easily realized, and the safety of on-site workers is assured. Further, since the aforementioned switching can be performed by a push-pull operation of causing the handle to be moved in the direction of the axis of rotation, ease of operation is satisfactory.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
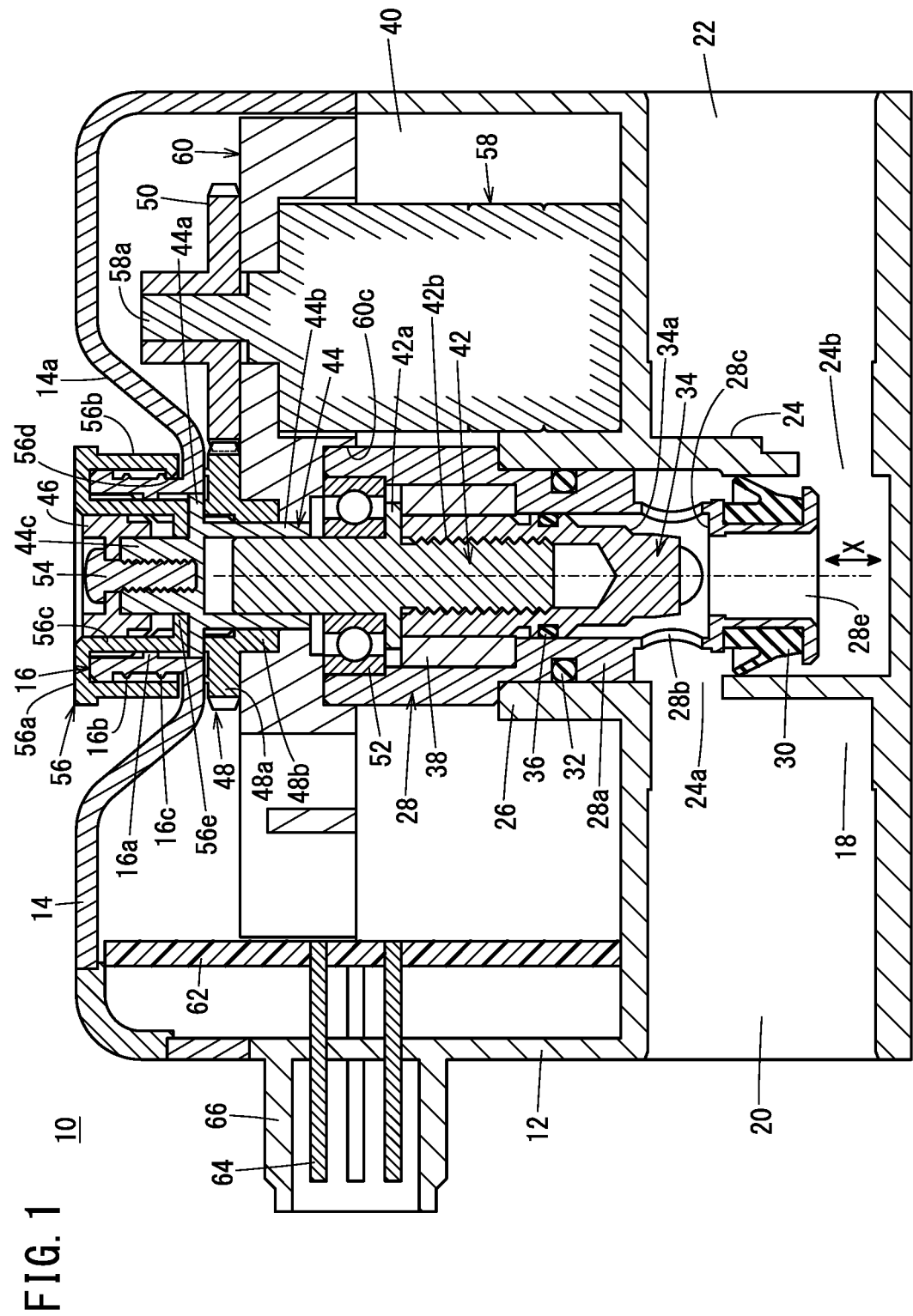
FIG. 1 is a cross-sectional view of a flow rate adjusting valve according to an embodiment of the present invention, when a handle is in a lower limit position, and the valve opening degree is maximum (a fully open state)

A flow rate adjusting valve 10 according to an embodiment of the present invention is used to adjust the flow rate of a fluid such as compressed air or the like. In the following description, when the terms in relation to the up, down, left, and right directions are used, for the sake of convenience, such terms refer to the directions shown in the drawings, however, the actual arrangement of the respective component members is not necessarily limited to this feature.

Figure 3:
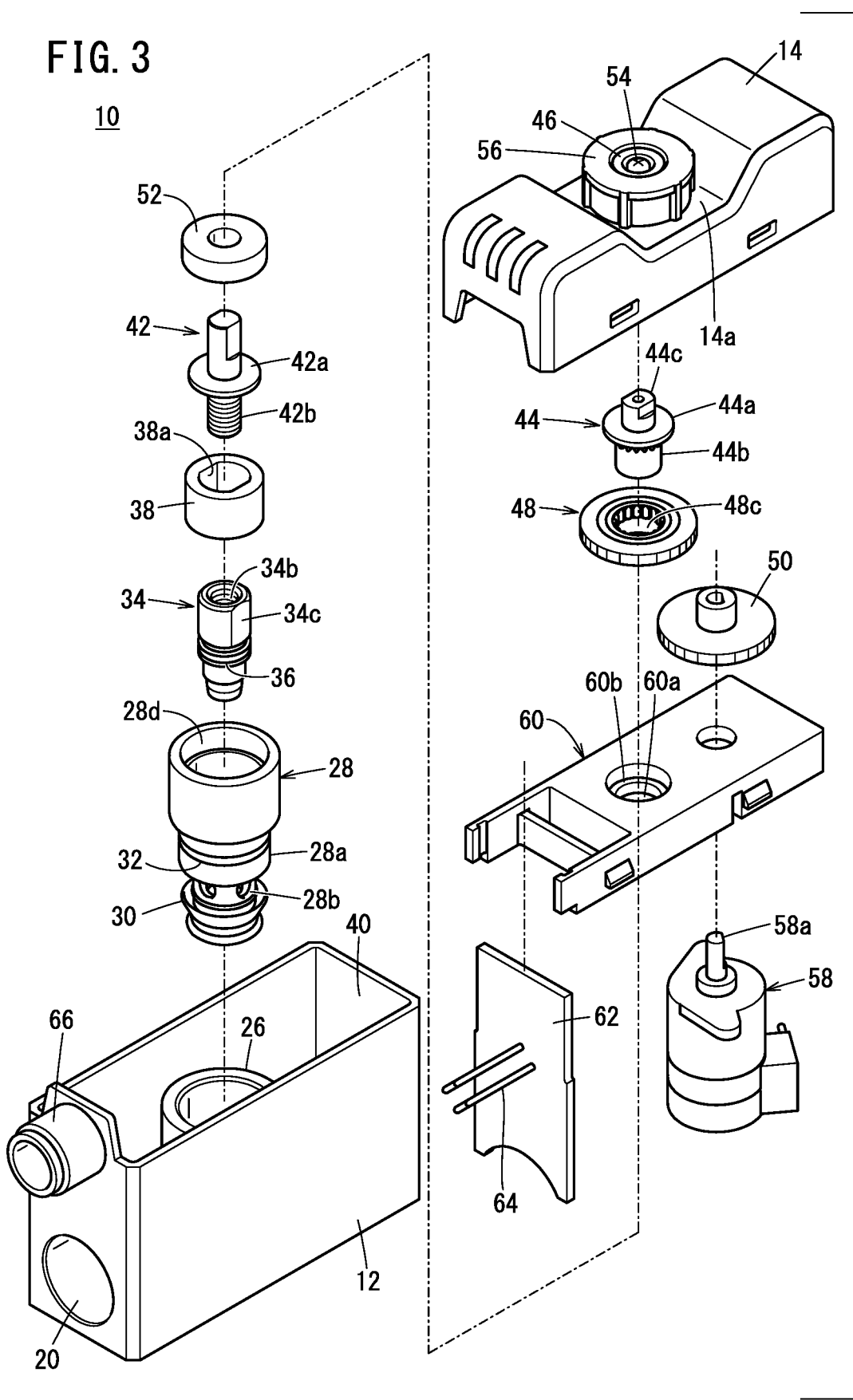
FIG. 3 is a view in which the flow rate adjusting valve shown in FIG. 1 is expanded into parts or groups of parts.

As shown in FIGS. 1 and 3, the flow rate adjusting valve 10 includes a main body 12, a cover 14, a valve seat body 28, a needle valve 34, a handle 56, a stepping motor (electric motor) 58, and a motive power transmission mechanism. The motive power transmission mechanism is a mechanism that selectively switches between a rotational operating force of the handle 56 and a driving force of the stepping motor 58, and transmits the selected force to the needle valve 34. Details of the motive power transmission mechanism will be described later. The stepping motor 58 has a non-illustrated speed reducing gear incorporated therein. According to the present embodiment, the stepping motor 58 is used as the electric motor, but other types of electric motors may also be used.

The box-shaped main body 12 includes an accommodating chamber 40 in which the stepping motor 58 and the motive power transmission mechanism are accommodated in cooperation with the cover 14. The cover 14 is attached to a support frame 60, which will be described later. An upper surface of the cover 14 is recessed downward at a position in proximity to a central location thereof in the longitudinal direction. The center of a bottomed surface of a recess 14a is open. A tubular handle supporting member 16 that rises upwardly from an open edge of the recess 14a is provided integrally with the cover 14.

A lower part of the main body 12 includes a fluid passage 18 both ends of which are open, and which extends in a left and right direction. A first port 20 that opens on one end of the fluid passage 18, and a second port 22 that opens on another end of the fluid passage 18 are respectively connected to non-illustrated external pipes. According to the present embodiment, a configuration is provided so that, by action of a later-described check valve 30, the flow rate can be adjusted when the fluid flows from the first port 20 toward the second port 22.

The valve seat body 28 and the needle valve 34 are arranged in a manner so as to intersect the fluid passage 18. A cylindrical shaped guide wall 24 for guiding the fluid is arranged at a central location of the fluid passage 18 in the longitudinal direction. A central axis of the guide wall 24 is aligned with a central axis of the valve seat body 28 and the needle valve 34. The guide wall 24 includes a first window portion 24a, which is formed at an upper location of a portion of the guide wall that is closer to the first port 20. The guide wall 24 includes a second window portion 24b, which is formed at a lower location of a portion of the guide wall that is closer to the second port 22. The first port 20 is connected to the second port 22 via the first window portion 24a and the second window portion 24b. The guide wall 24 extends into the accommodating chamber 40, and the extended portion thereof constitutes a supporting wall 26 that supports the valve seat body 28.

The tubular valve seat body 28 includes a supporting portion 28a, which is positioned at a central location of the valve seat body in the longitudinal direction. The supporting portion 28a is fitted and fixed to an inner side of the supporting wall 26 of the main body 12. On the inner side of the valve seat body 28, the needle valve 34 is inserted and arranged so as to be capable of moving in the X direction, which is the axial direction thereof. A distal end of the needle valve 34 faces toward the fluid passage 18. The outer circumference of a portion of the needle valve 34 that is in proximity to a distal end of the needle valve has a tapered surface 34a.

Figure 2:
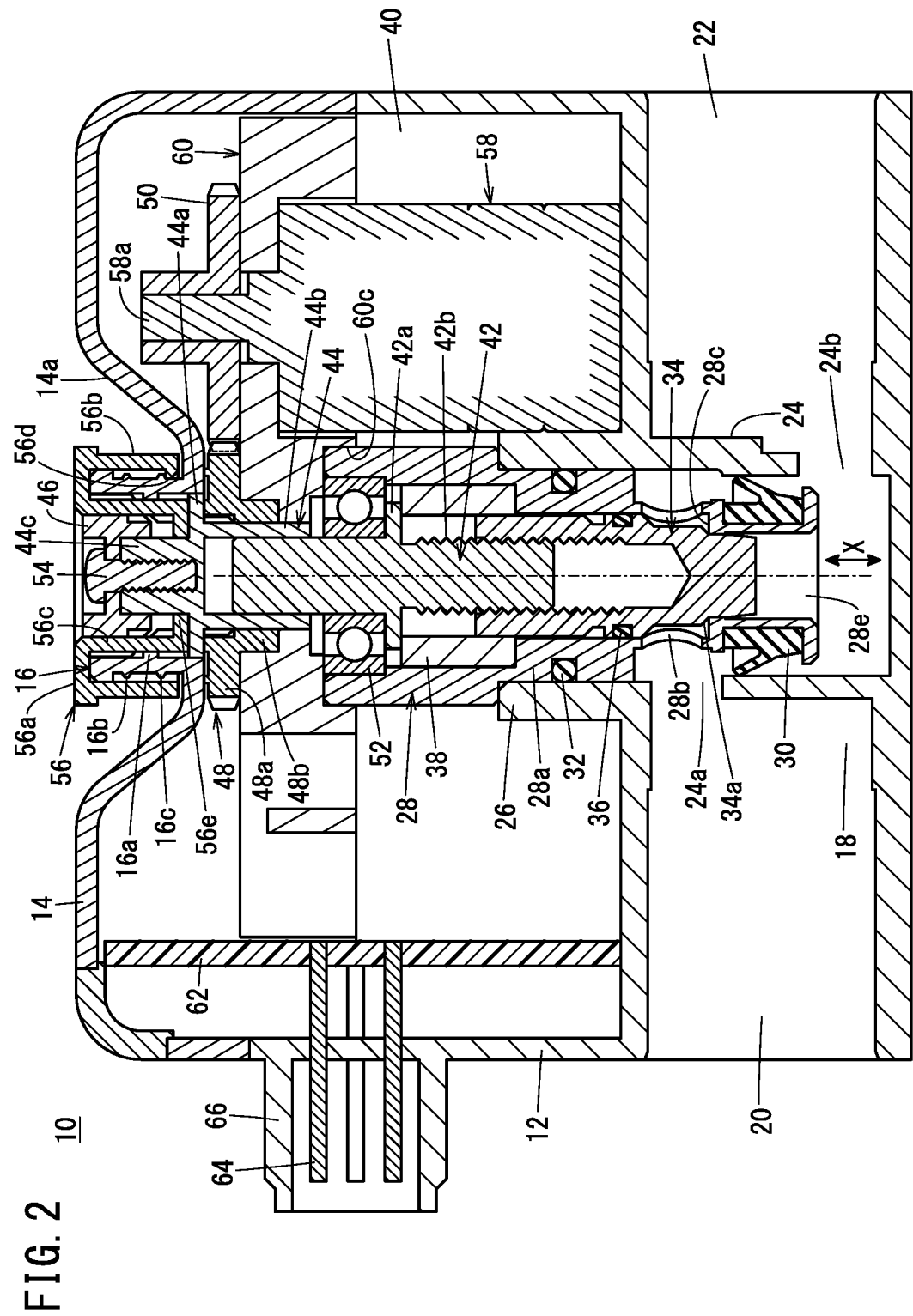
FIG. 2 is a cross-sectional view of the flow rate adjusting valve shown in FIG. 1, when the handle is in the lower limit position, and the valve opening degree is zero (a fully closed state)

A more downward location than the supporting portion 28a of the valve seat body 28 includes a plurality of lateral holes 28b that penetrate through the side wall of the valve seat body 28. The valve seat body 28 further includes a valve seat 28c at a more downward location than the lateral holes 28b. The valve seat is capable of abutting against the tapered surface 34a of the needle valve 34. In a state in which the needle valve 34 is separated away from the valve seat 28c, the first window portion 24a communicates with the second window portion 24b via the lateral holes 28b of the valve seat body 28 and a lower end opening 28e of the valve seat body 28. As shown in FIG. 2, in a state in which the needle valve 34 is placed in abutment against the valve seat 28c, communication between the first window portion 24a and the second window portion 24b via the lateral holes 28b of the valve seat body 28 and the lower end opening 28e of the valve seat body 28 is blocked.

A check valve 30, which can be placed in pressure-contact with an inner circumference of the guide wall 24 of the main body 12, is mounted on the outer circumference of a lower end part of the valve seat body 28. The check valve 30 prevents the fluid from flowing from the first window portion 24a to the second window portion 24b through a gap between the lower end part of the valve seat body 28 and the guide wall 24. The check valve 30 allows the fluid to flow through the aforementioned gap from the second window portion 24b to the first window portion 24a. In a state in which the needle valve 34 is placed in abutment against the valve seat 28c, flowing of the fluid from the first port 20 to the second port 22 is prevented. In a state in which the needle valve 34 is separated away from the valve seat 28c, the fluid flows from the first port 20 toward the second port 22 at a flow rate corresponding to a flow path area which changes in accordance with the separation distance thereof.

A cylindrical collar 38 that supports an upper end part of the needle valve 34 is fixed to an inner surface of the valve seat body 28 at a more upward location than the supporting portion 28a. An outer circumference of the needle valve 34 and an inner circumference of the collar 38 are equipped with two sets of flat surfaces 34c and 38a that abut against one another. Consequently, the needle valve 34 is supported by the collar 38, in a manner so that rotation about a central axis is restricted, together with the needle valve 34 being capable of moving in the axial direction. According to the embodiment, the two sets of flat surfaces are used as a means for preventing the needle valve 34 from rotating with respect to the collar 38. However, a means such as a set of flat surface portions (D-cuts), splines, or the like may also be used.

An annular seal member 32, which abuts against an inner circumference of the supporting wall 26 of the main body 12, is mounted on an outer circumference of the supporting portion 28a of the valve seat body 28. Further, an annular needle packing 36, which is placed in sliding contact with an inner circumference of the supporting portion 28a of the valve seat body 28, is mounted on the outer circumference of the needle valve 34. The fluid passage 18 is separated in an airtight manner from the accommodating chamber 40 by the seal member 32 and the needle packing 36. Since the needle valve 34 is formed with a structure in which rotation about the central axis does not take place, the load applied to the needle packing 36 is reduced, and the durability of the needle packing 36 is enhanced.

The motive power transmission mechanism includes a feed screw 42, a stem 44, a handle holder 46, a valve gear 48, and a motor gear 50. The rotational operating force of the handle 56 is transmitted to the needle valve 34 via the handle holder 46, the stem 44, and the feed screw 42. The driving force of the stepping motor 58 is transmitted to the needle valve 34 via the motor gear 50, the valve gear 48, the stem 44, and the feed screw 42. Stated otherwise, the motive power transmission path between the handle 56 and the needle valve 34 is constituted by the handle holder 46, the stem 44, and the feed screw 42. The motive power transmission path between the stepping motor 58 and the needle valve 34 is constituted by the motor gear 50, the valve gear 48, the stem 44, and the feed screw 42. Hereinafter, a description will be given in detail of the motive power transmission mechanism.

The feed screw 42 includes a flange 42a in a central location thereof in the longitudinal direction, and further includes a male screw 42b on an outer circumference at a more downward location than the flange 42a. The feed screw 42 is rotatably supported by a bearing 52 provided on an upper end opening 28d of the valve seat body 28, at a more upward location than the flange 42a. An upper end of the feed screw 42 projects upwardly from the bearing 52, and is fitted on an inner side of a later-described cylindrical portion 44b of the stem 44.

The needle valve 34 includes a bottomed screw hole 34b that opens at the upper end of the needle valve 34. A lower portion of the feed screw 42 is screwed-engaged with the screw hole 34b. The flange 42a of the feed screw 42 is arranged in a manner of being sandwiched between a lower surface of the bearing 52 and an upper surface of the collar 38. Consequently, movement of the feed screw 42 in the X direction, which is the axial direction, is restricted. When the feed screw 42 is rotated, the needle valve 34, the rotation of which about the central axis is restricted, moves in the axial direction.

The stem 44 includes a plate-shaped flange portion 44a that extends in a horizontal direction, a cylindrical portion 44b extending downward from the flange portion 44a and the distal end of which is open, and a protruding portion 44c that protrudes upwardly from the flange portion 44a. The cylindrical portion 44b of the stem 44 is connected to the upper end part of the feed screw 42 by a predetermined means for preventing rotation. Consequently, the feed screw 42 rotates integrally with the stem 44, and the stem 44 is capable of moving relative to the feed screw 42 in the X direction, which is the axial direction. According to the present embodiment, two sets of flat surface portions are used as the means for preventing rotation, but one set of flat surface portions (D-cuts), splines, or the like may also be used.

Upward movement of the stem 44 is restricted by the flange portion 44a of the stem 44 coming into abutment against a step portion 16a, which is disposed in a projecting manner from an inner circumference of the handle supporting member 16 of the cover 14. An outer circumference of the upper end part of the cylindrical portion 44b of the stem 44 is equipped with splines 44d that engage with later-described splines 48d of the valve gear 48 (see FIG. 4). The handle holder 46 is fixed by a mounting screw 54 to the protruding portion 44c of the stem 44. An outer circumference of the handle holder 46 includes splines 46a that engage with later-described first splines 56f of the handle 56 (see FIG. 5).

Figure 4:
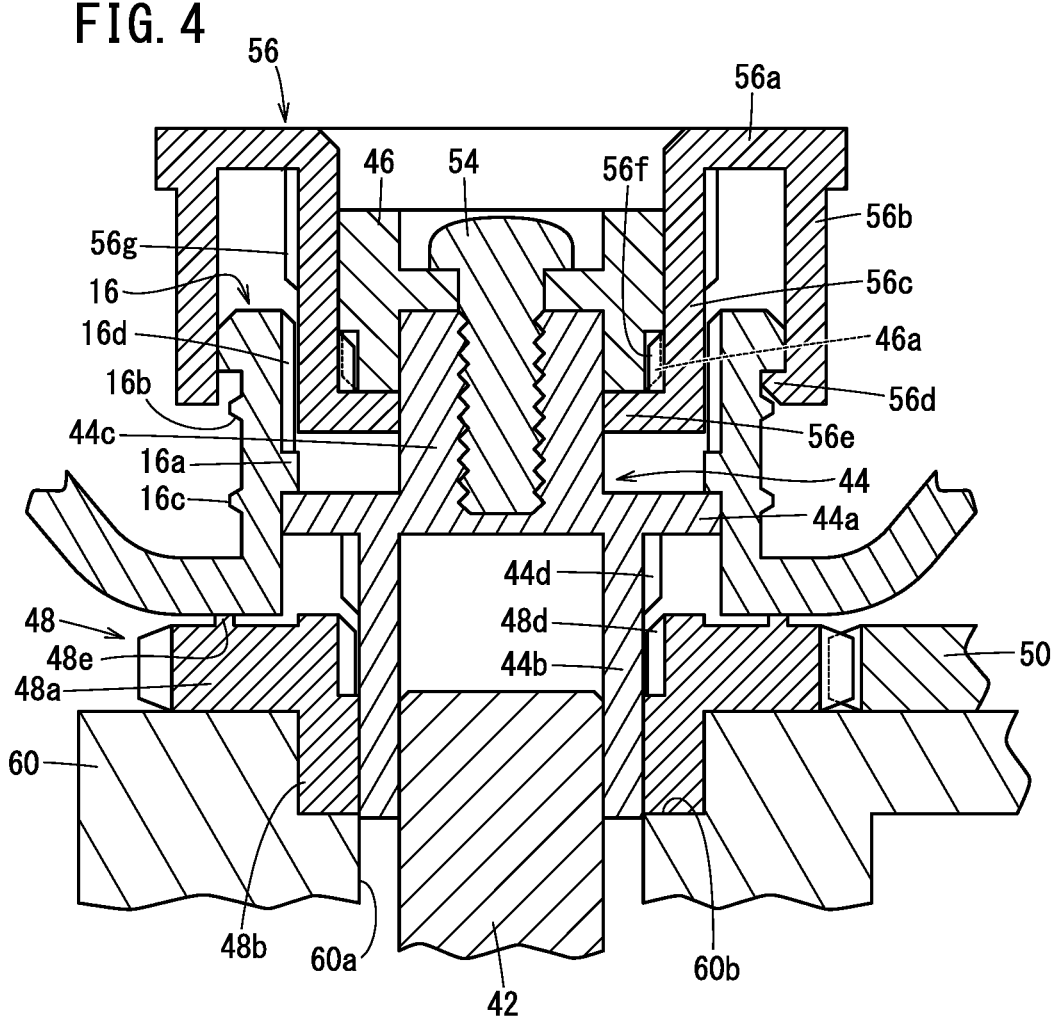
FIG. 4 is a cross-sectional view of principal components of the flow rate adjusting valve shown in FIG. 1, when the handle is in an upper limit position.

The handle 56 includes an annular seat portion 56a, an outer tubular portion 56b extending downward from an outer circumferential part of the seat portion 56a, and an inner tubular portion 56c extending downward from an inner circumferential part of the seat portion 56a. A lower end of the outer tubular portion 56b is equipped with a rib 56d that projects inwardly in the radial direction. A lower end of the inner tubular portion 56c is equipped with a flange 56e that extends inwardly in the radial direction. As shown in FIG. 4, an inner circumference of the inner tubular portion 56c in proximity to the lower end is provided with first splines 56f that engage with the splines 46a of the handle holder 46. Further, an outer circumference of the inner tubular portion 56c in proximity to the upper end is provided with second splines 56g that engage with splines 16d provided on the inner circumference of the handle supporting member 16 of the cover 14.

The handle 56 is capable of being subjected to a push-pull operation, and is capable of moving in the X direction (upper and lower direction), which is the direction of the axis of rotation thereof, between the upper limit position (upward end of movement) and the lower limit position (downward end of movement) as will be discussed below. When the upper surface of the flange 56e of the handle 56 abuts against the lower surface of the handle holder 46 and the handle holder 46 is pulled upward, the flange portion 44a of the stem 44 which moves integrally with the handle holder 46 abuts against the step portion 16a of the handle supporting member 16. As a result, the handle 56 arrives at the upper limit position (see FIG. 4).

The handle supporting member 16 enters into a space between the inner tubular portion 56c and the outer tubular portion 56b of the handle 56. When a lower surface of the seat portion 56a of the handle 56 abuts against an upper end of the handle supporting member 16, the handle 56 arrives at the lower limit position (see FIG. 1). When the handle 56 is at the upper limit position, the handle 56 protrudes significantly upward from the cover 14, whereby the rotational operation becomes easy to perform. When the handle 56 is at the lower limit position, the handle 56 enters into the recess 14a of the cover 14.

When the handle 56 is moved upward (in a first direction), the first splines 56f of the inner tubular portion 56c engage with the splines 46a of the handle holder 46. As a result, the handle 56, the handle holder 46, and the stem 44 can be rotated together in an integral manner. Further, when the handle 56 is moved to the upper limit position, engagement between the second splines 56g of the inner tubular portion 56c and the splines 16d of the handle supporting member 16 is released.

When the handle 56 is moved downward (in a second direction), engagement between the first splines 56f of the inner tubular portion 56c and the splines 46a of the handle holder 46 that is integral with the stem 44 is released. When the handle 56 is moved downward, the second splines 56g of the inner tubular portion 56c engage with the splines 16d of the handle supporting member 16, and rotation of the handle 56 is prevented. Further, when the second splines 56g of the inner tubular portion 56c start to engage with the splines 16d of the handle supporting member 16, the flange 56e of the inner tubular portion 56c comes into abutment against the flange portion 44a of the stem 44. Due to the flange 56e pushing the flange portion 44a downward, the stem 44 moves downward together with the handle 56.

The outer circumference of the handle supporting member 16 of the cover 14 is equipped with a first rib 16b and a second rib 16c that are arranged at a predetermined interval in the vertical direction. The first rib 16b and the second rib 16c engage with the rib 56d of the outer tubular portion 56b of the handle 56. When the handle 56 is pulled up to the upper limit position, the rib 56d of the handle 56 snap-engages with the first rib 16b of the handle supporting member 16. When the handle 56 is pushed down to the lower limit position, the rib 56d of the handle 56 snap-engages with the second rib 16c of the handle supporting member 16. Accordingly, unless an external force is applied thereto, the handle 56 that has reached the upper limit position or the lower limit position is stably retained at the upper limit position or the lower limit position.

In the accommodating chamber 40, the support frame 60 which serves to support the stepping motor 58 is arranged in the horizontal direction. The support frame 60 is attached to the main body 12 by a non-illustrated fixing means. The valve gear 48 enmeshes with the motor gear 50 that is attached to an output shaft 58a of the stepping motor 58, and rotates in conjunction with the output shaft 58a of the stepping motor 58. The valve gear 48 and the motor gear 50 are arranged on an upper surface of the support frame 60. The valve gear 48 is made up from a gear portion 48a having teeth on the outer circumference thereof, and a shaft portion 48b that protrudes downward from the gear portion 48a. The gear portion 48a and the shaft portion 48b include a central hole 48c that penetrates in the X direction, which is the axial direction thereof. An inner circumference of the gear portion 48a is equipped with the splines 48d that engage with the splines 44d of the stem 44 (see FIG. 4).

The support frame 60 includes an insertion hole 60a into which the feed screw 42 and the stem 44 are inserted. An upper part of the insertion hole 60a is formed with an enlarged diameter that serves as a first recess 60b for supporting the shaft portion 48b of the valve gear 48. A lower part of the insertion hole 60a has a diameter that is enlarged stepwise, and forms a second recess 60c into which the upper end part of the valve seat body 28 is inserted. The shaft portion 48b of the valve gear 48 is inserted into the first recess 60b. A convex portion 48e provided on an upper surface of the gear portion 48a abuts against the cover 14. Due to this feature, the valve gear 48 is supported so as to be capable of rotating about the central axis, while movement thereof in the X direction, which is the axial direction, is restricted. The support frame 60 is positioned in the interior of the accommodating chamber 40 by fitting the upper end part of the valve seat body 28 into the second recess 60c of the support frame 60.

The cylindrical portion 44b of the stem 44 is inserted into the central hole 48c of the valve gear 48 and the insertion hole 60a of the support frame 60. When the stem 44 is moved downward by pushing down on the handle 56, the splines 44d of the stem 44 engage with the splines 48d of the valve gear 48. Consequently, the driving force of the stepping motor 58 is transmitted to the feed screw 42 via the motor gear 50, the valve gear 48, and the stem 44. On the other hand, when the stem 44 is moved upward by pulling the handle 56 upward, engagement between the splines 44d of the stem 44 and the splines 48d of the valve gear 48 is released.

A circuit board 62, which is perpendicular with respect to the support frame 60, is disposed in the accommodating chamber 40. Electronic components in order to drive the stepping motor 58 are mounted on the circuit board 62. Needle-shaped terminals 64 that are erected on the circuit board 62 extend to the inner side of a tubular connector portion 66 provided on a side surface of the main body 12. Non-illustrated wirings are provided between the circuit board 62 and the stepping motor 58. The stepping motor 58 is driven by a remote control signal supplied from the terminals 64.

The flow rate adjusting valve 10 according to the present embodiment is configured in the manner described above. Hereinafter, descriptions will be given concerning a case in which the valve opening degree is adjusted by remote control, and a case in which the valve opening degree is manually adjusted. As shown in FIG. 4, the state in which the handle 56 is in the upper limit position is regarded as an initial state.

Figure 5:
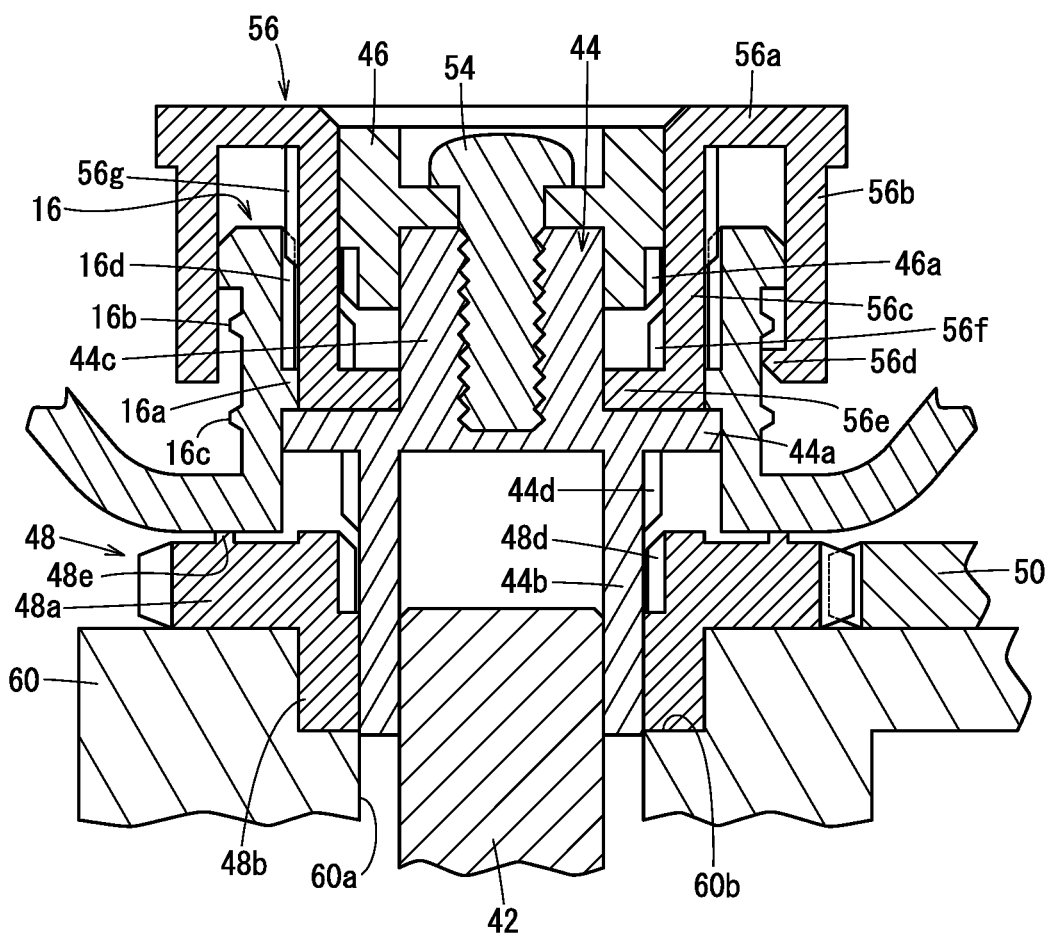
FIG. 5 is a cross-sectional view of principal components of the flow rate adjusting valve shown in FIG. 1, in a state during which the handle is being pushed down from the upper limit position to the lower limit position.

For driving the stepping motor 58 by remote control to thereby adjust the valve opening degree, the handle 56, which is at the upper limit position, is pushed down to the lower limit position. As shown in FIG. 5, when the handle 56 is pushed downward, initially, the engagement between the first splines 56f of the inner tubular portion 56c of the handle 56 and the splines 46a of the handle holder 46 is released, and the stem 44, which is integral with the handle holder 46, is released from the connected state with the handle 56. More specifically, the motive power transmission path between the handle 56 and the needle valve 34 is interrupted midway, i.e., interrupted between the handle 56 and the handle holder 46. Moreover, an appropriate frictional force is applied at a location where the upper end part of the feed screw 42 is fitted into the cylindrical portion 44b of the stem 44, or alternatively, at a location where the cylindrical portion 44b of the stem 44 is inserted through the central hole 48c of the valve gear 48. Therefore, when the handle 56 is pushed down, the stem 44 does not move downward immediately.

Further, substantially at the same time that the engagement between the first splines 56f of the handle 56 and the splines 46a of the handle holder 46 is released, the second splines 56g of the inner tubular portion 56c of the handle 56 start to engage with the splines 16d of the handle supporting member 16, and a state is brought about in which rotation of the handle 56 is prevented.

In addition, when the handle 56 is pushed down in close proximity to the lower limit position, the stem 44 is pushed down by the flange 56e of the handle 56, and the splines 44d of the stem 44 engage with the splines 48d of the valve gear 48 (see FIG. 1). Consequently, a state is brought about in which the driving force of the stepping motor 58 is capable of being transmitted to the needle valve 34 via the motor gear 50, the valve gear 48, the stem 44, and the feed screw 42. More specifically, the motive power transmission path between the stepping motor 58 and the needle valve 34 becomes continuous.

As noted previously, when the handle 56 is pushed down, a state is brought about in which the motive power transmission path between the handle 56 and the needle valve 34 is interrupted midway and rotation of the handle 56 is prevented. If the handle 56 is further pushed down to the lower limit position, the motive power transmission path between the stepping motor 58 and the needle valve 34 becomes continuous. In such a state, the stepping motor 58 can be driven by remote control, thereby causing the needle valve 34 to be moved in the axial direction, and enabling the valve opening degree to be adjusted.

Figure 6:
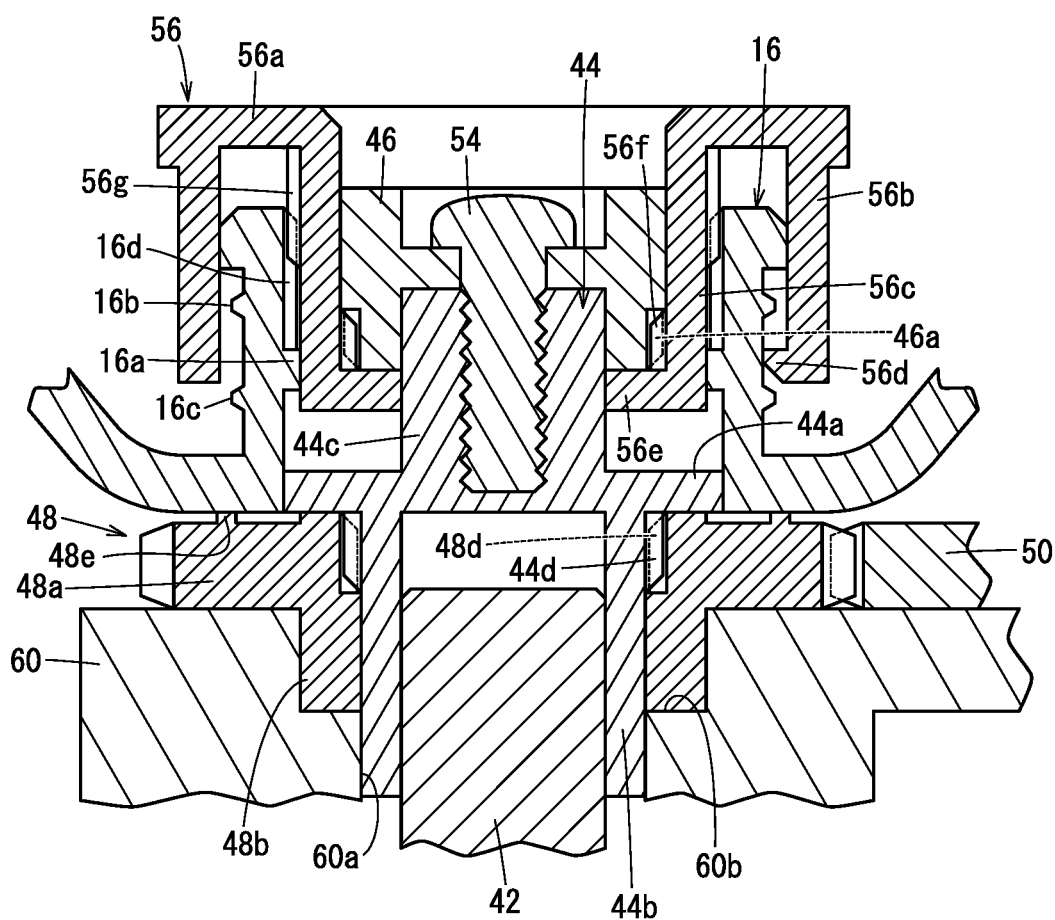
FIG. 6 is a cross-sectional view of principal components of the flow rate adjusting valve shown in FIG. 1, in a state during which the handle is being pulled upward from the lower limit position to the upper limit position.

Next, in order to manually adjust the valve opening degree, the handle 56 which is at the lower limit position is pulled upward to the upper limit position. As shown in FIG. 6, when the handle 56 is pulled upward, initially, the first splines 56f of the inner tubular portion 56c engage with the splines 46a of the handle holder 46, and the three constituent elements, i.e., the handle 56, the handle holder 46, and the stem 44, are integrally connected in the direction of rotation. Owing to this feature, the motive power transmission path between the handle 56 and the needle valve 34 becomes continuous. Incidentally, the engagement between the second splines 56g of the inner tubular portion 56c and the splines 16d of the handle supporting member 16 cannot be released unless the handle 56 is pulled upward to a portion in close proximity to the upper limit position. Therefore, at this point in time, the handle 56 cannot be rotated.

Subsequently, when the handle 56 is pulled upward to a position in close proximity to the upper limit position, the handle holder 46 is pushed up by the flange 56e of the handle 56. Consequently, the engagement between the splines 44d of the stem 44, which moves integrally with the handle holder 46, and the splines 48d of the valve gear 48 is released (see FIG. 4). Further, the engagement between the second splines 56g of the inner tubular portion 56c of the handle 56 and the splines 16d of the handle supporting member 16 is released. By the engagement between the splines 44d of the stem 44 and the splines 48d of the valve gear 48 being released, the motive power transmission path between the stepping motor 58 and the needle valve 34 is interrupted midway.

Accordingly, if the handle 56 is pulled upward to the upper limit position, a situation is brought about in which the handle 56 can be manually rotated. Therefore, by rotating the handle 56, the needle valve 34 can be moved in the axial direction via the handle holder 46, the stem 44, and the feed screw 42, and the valve opening degree can be adjusted.

A case is assumed in which, while an on-site worker is pulling the handle 56 upward, prior to the engagement between the splines 48d of the valve gear 48 and the splines 44d of the stem 44 being released, the stepping motor 58 is driven by a remote control signal, and such a driving force is transmitted to the handle 56 by way of the stem 44. Even in such a case, the second splines 56g of the inner tubular portion 56c of the handle 56 are engaged with the splines 16d of the handle supporting member 16. Therefore, the handle 56 does not rotate unexpectedly, and the safety of an operator who is gripping the handle 56 is assured.

In accordance with the flow rate adjusting valve 10 according to the present invention, there is provided the motive power transmission mechanism that selectively switches between the rotational operating force of the handle 56 and the driving force of the stepping motor 58, and transmits the selected force to the needle valve 34. Therefore, regardless of the specifications of the stepping motor 58, manual operation of the handle can be easily realized, and the safety of on-site workers is assured. Further, since the aforementioned switching can be performed by a push-pull operation of causing the handle 56 to be moved in the direction of the axis of rotation, ease of operation is satisfactory.

The present invention is not limited to the above-described embodiment, and various configurations can be adopted therein without departing from the essence and gist of the present invention as set forth in the appended claims.

What is claimed is:

1. A flow rate adjusting valve in which a needle valve is arranged so as to face a fluid passage of a main body, the flow rate adjusting valve comprising:
    a handle configured to enable a rotational operation to be performed manually;
    an electric motor configured to be operated remotely; and
    a motive power transmission mechanism configured to selectively switch between a rotational operating force of the handle and a driving force of the electric motor, and to transmit the force to the needle valve,
    wherein the switching is performed by causing the handle to be moved in a direction of an axis of rotation,
    wherein:
    the handle is configured to be moved along the axis of rotation of the handle in first and second directions that are mutually opposite to each other;
    when the handle is pulled and moved in the first direction, a motive power transmission path between the handle and the needle valve is made continuous, and a motive power transmission path between the electric motor and the needle valve is interrupted midway; and
    when the handle is pushed and moved in the second direction, the motive power transmission path between the handle and the needle valve is interrupted midway, and the motive power transmission path between the electric motor and the needle valve is made continuous, and
    wherein:
    each of the handle and a handle supporting member of the main body comprises splines, the splines of the handle and the splines of the handle supporting member being configured to be mutually engaged; and
    when the handle is moved in the second direction from an end of movement in the first direction, the splines of the handle encase with the splines of the handle supporting member, whereby rotation of the handle is prevented.

2. The flow rate adjusting valve according to claim 1, further comprising a cover configured to accommodate the electric motor and the motive power transmission mechanism in cooperation with the main body, wherein the cover includes a recess into which the handle enters when the handle is moved to an end of movement in the second direction.

3. The flow rate adjusting valve according to claim 1, wherein:
    the motive power transmission mechanism includes a feed screw configured to be screw-engaged with the needle valve,
    rotation of the needle valve about a central axis is restricted;
    movement of the feed screw in an axial direction is restricted; and
    when the screw is rotated, the needle valve moves in the axial direction.

4. The flow rate adjusting valve according to claim 3, wherein:
    the motive power transmission mechanism includes a stem configured to move in an axial direction of the feed screw;
    the feed screw rotates integrally with the stem; and
    the rotational operating force of the handle and the driving force of the electric motor are transmitted to the needle valve via the stem and the feed screw.

5. The flow rate adjusting valve according to claim 4, wherein:
    when the handle moves in the first direction from an end of movement in the second direction, splines provided on the handle engage with splines provided on a handle holder fixed to the stem; and when the handle moves in the second direction, the stem moves in a same direction, and splines provided on the stem engage with splines provided on a valve gear configured to operate in conjunction with an output shaft of the electric motor.

6. The flow rate adjusting valve according to claim 5, wherein:

when the stem, which is integrated with the handle holder configured to be moved by abutment against the handle, abuts against a step portion provided on a handle supporting member, the handle reaches an end of movement in the first direction; and when the handle abuts against an end part of the handle supporting member, the handle reaches the end of movement in the second direction.

7. The flow rate adjusting valve according to claim 6, wherein:

when the handle reaches the end of movement in the first direction, a rib provided on the handle snap-engages with a first rib provided on the handle supporting member; and when the handle reaches the end of movement in the second direction, the rib provided on the handle snap-engages with a second rib provided on the handle supporting member.

8. The flow rate adjusting valve according to claim 3, wherein:

the needle valve is inserted and arranged inside a valve seat body fixed to the main body; and a needle packing in sliding contact with the valve seat body is mounted on an outer circumference of the needle valve.

\* \* \* \* \*

UNITED STATES PATENT AND TRADEMARK OFFICE
CERTIFICATE OF CORRECTION

| | |
|---|---|
| PATENT NO. | : 11,506,301 B2 |
| APPLICATION NO. | : 17/452088 |
| DATED | : November 22, 2022 |
| INVENTOR(S) | : Yuta Oshima |

It is certified that error appears in the above-identified patent and that said Letters Patent is hereby corrected as shown below:

In the Claims

In Column 10, Line 36, delete "encase" and insert --engage--.

Signed and Sealed this
Thirtieth Day of May, 2023

Katherine Kelly Vidal
*Director of the United States Patent and Trademark Office*